United States Patent
Taylor et al.

(10) Patent No.: US 10,024,537 B2
(45) Date of Patent: Jul. 17, 2018

(54) COMBUSTOR ASSEMBLY WITH CHUTES

(71) Applicant: Rolls-Royce North American Technologies, Inc., Indianapolis, IN (US)

(72) Inventors: Todd S. Taylor, Bargersville, IN (US); Jack D. Petty, Indianapolis, IN (US); Kenneth W. Froemming, Carmel, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 224 days.

(21) Appl. No.: 14/734,814

(22) Filed: Jun. 9, 2015

(65) Prior Publication Data

US 2015/0362190 A1     Dec. 17, 2015

Related U.S. Application Data

(66) Substitute for application No. 62/013,217, filed on Jun. 17, 2014.

(51) Int. Cl.
| | | |
|---|---|---|
| *F23R 3/00* | (2006.01) | |
| *F23R 3/02* | (2006.01) | |
| *F23R 3/04* | (2006.01) | |
| *F23R 3/16* | (2006.01) | |
| *F23R 3/06* | (2006.01) | |
| *F23R 3/50* | (2006.01) | |

(52) U.S. Cl.
CPC ............... *F23R 3/002* (2013.01); *F23R 3/02* (2013.01); *F23R 3/04* (2013.01); *F23R 3/045* (2013.01); *F23R 3/06* (2013.01); *F23R 3/16* (2013.01); *F23R 3/50* (2013.01); *F23R 2900/00017* (2013.01); *F23R 2900/03041* (2013.01); *Y02T 50/675* (2013.01); *Y10T 29/49236* (2015.01)

(58) Field of Classification Search
CPC .. F23R 3/002; F23R 3/045; F23R 3/06; F23R 3/04; F23R 3/16
See application file for complete search history.

(56) References Cited

U.S. PATENT DOCUMENTS

| | | |
|---|---|---|
| 3,981,142 A | 9/1976 | Irwin |
| 4,132,066 A | 1/1979 | Austin et al. |
| 4,315,405 A | 2/1982 | Pidcock et al. |
| 4,700,544 A | 10/1987 | Fucci et al. |
| 4,875,339 A | 10/1989 | Rasmussen et al. |

(Continued)

OTHER PUBLICATIONS

Extended European Search Report issued for European Application No. 15170874.0-1602, dated Oct. 21, 2015, 5 pages.

(Continued)

*Primary Examiner* — Gerald L Sung
*Assistant Examiner* — Katheryn Malatek
(74) *Attorney, Agent, or Firm* — Barnes & Thornburg LLP

(57) ABSTRACT

A combustor for use in a gas turbine engine includes a chute and a combustion liner defining a combustion chamber and a chute-receiving aperture that extends through the combustion liner. The chute extends through the chute-receiving aperture of the combustion liner and defines a passageway sized to convey air from an environment outside the combustion chamber through the combustion liner into the combustion chamber.

15 Claims, 5 Drawing Sheets

(56) References Cited

U.S. PATENT DOCUMENTS

| | | |
|---|---|---|
| 4,887,432 A | 12/1989 | Mumford |
| 5,235,805 A | 8/1993 | Barbier et al. |
| 5,581,999 A | 12/1996 | Johnson |
| 6,331,110 B1 | 12/2001 | Steber et al. |
| 6,351,949 B1 * | 3/2002 | Rice ................. F23R 3/007 403/316 |
| 6,499,993 B2 | 12/2002 | Steber et al. |
| 6,880,341 B2 | 4/2005 | Parkman et al. |
| 7,121,096 B2 | 10/2006 | Westlake et al. |
| 7,134,286 B2 | 11/2006 | Markarian et al. |
| 7,140,189 B2 | 11/2006 | Markarian et al. |
| 7,395,669 B2 | 7/2008 | Sherwood |
| 7,654,089 B2 | 2/2010 | Schilling et al. |
| 7,690,207 B2 | 4/2010 | Markarian et al. |
| 7,805,944 B2 | 10/2010 | Garry et al. |
| 7,926,280 B2 | 4/2011 | Morenko et al. |
| 8,015,706 B2 | 9/2011 | Markarian et al. |
| 8,024,933 B2 | 9/2011 | Woolford et al. |
| 8,047,008 B2 | 11/2011 | Lebegue et al. |
| 8,161,752 B2 | 4/2012 | Yankowich et al. |
| 8,281,600 B2 | 10/2012 | Chen et al. |
| 8,333,077 B2 | 12/2012 | Lebegue et al. |
| 2002/0184889 A1 | 12/2002 | Calvez et al. |
| 2009/0235668 A1 | 9/2009 | Johnson et al. |
| 2009/0255268 A1 | 10/2009 | Kaleeswaran et al. |
| 2012/0297778 A1 | 11/2012 | Rudrapatna et al. |
| 2013/0255265 A1 * | 10/2013 | Rudrapatna ............... F23R 3/06 60/754 |

OTHER PUBLICATIONS

European Search Report for European Patent Application Serial No. 15170874.0-1602, dated Aug. 2, 2016, (3 pages).

European Office Action, European Application No. 15170874.0-1602, dated Aug. 2, 2016, 3 pages.

European Office Action, European Application No. 15170874.0-1602, dated Nov. 22, 2017, 4 pages.

* cited by examiner

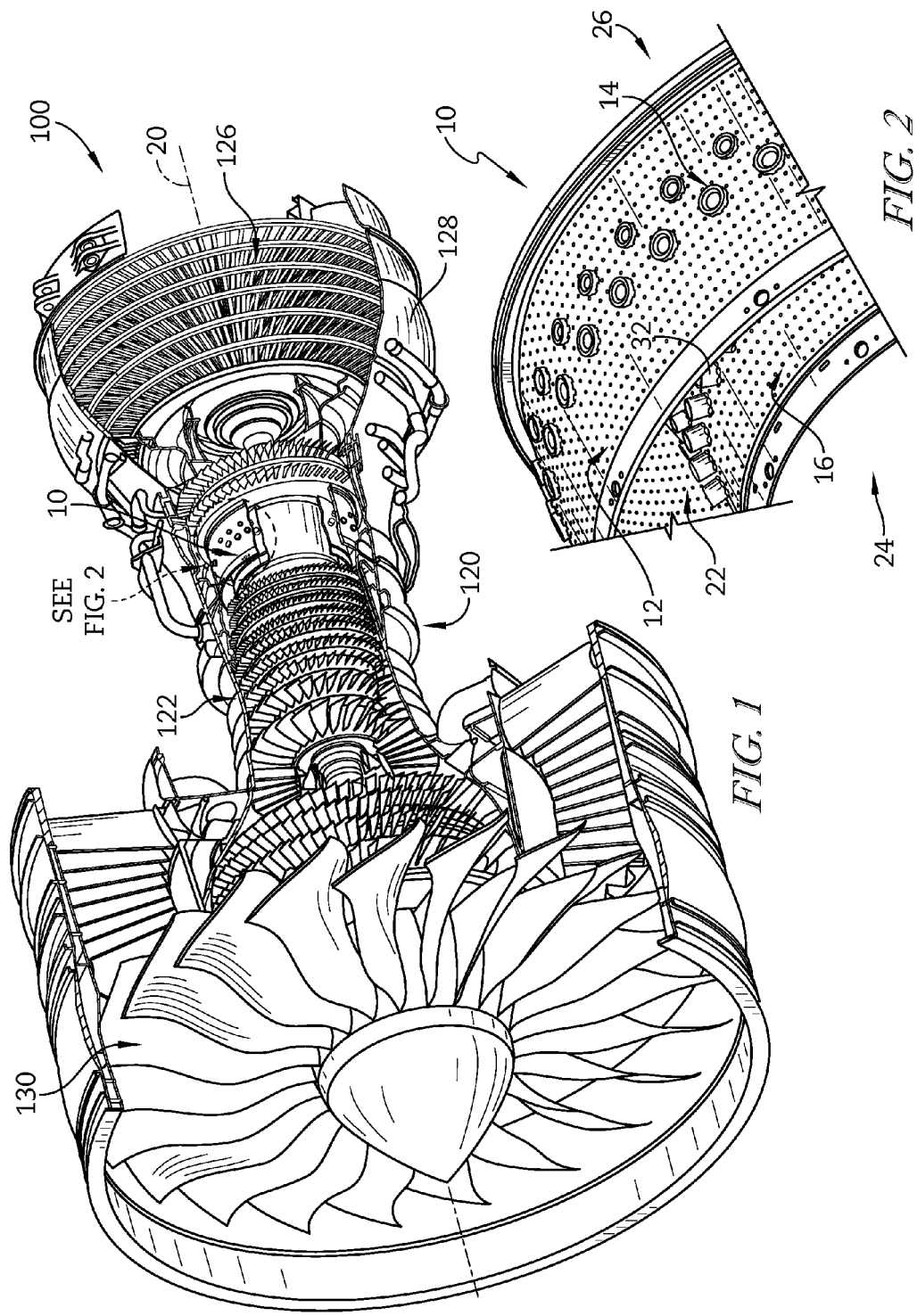

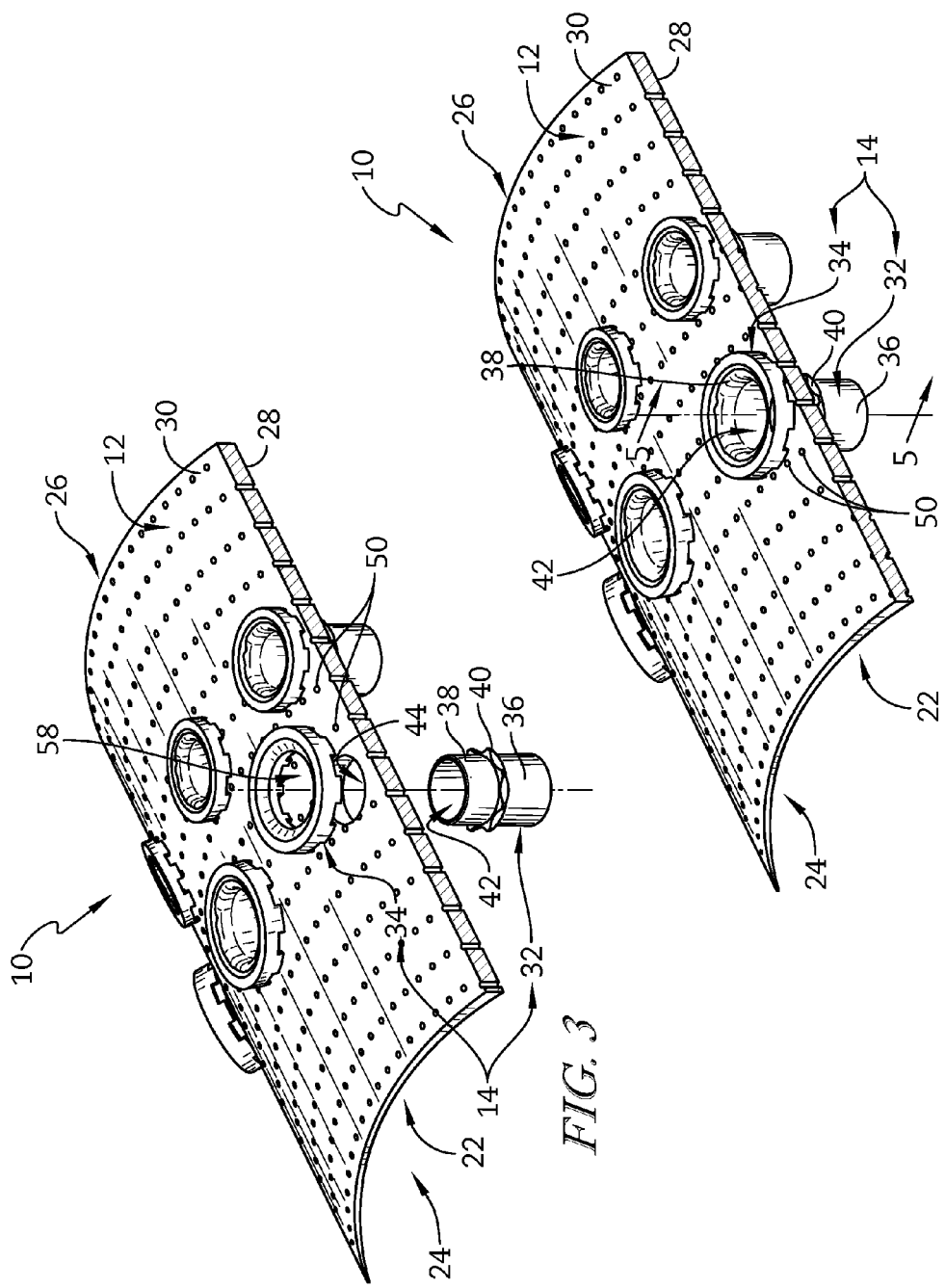

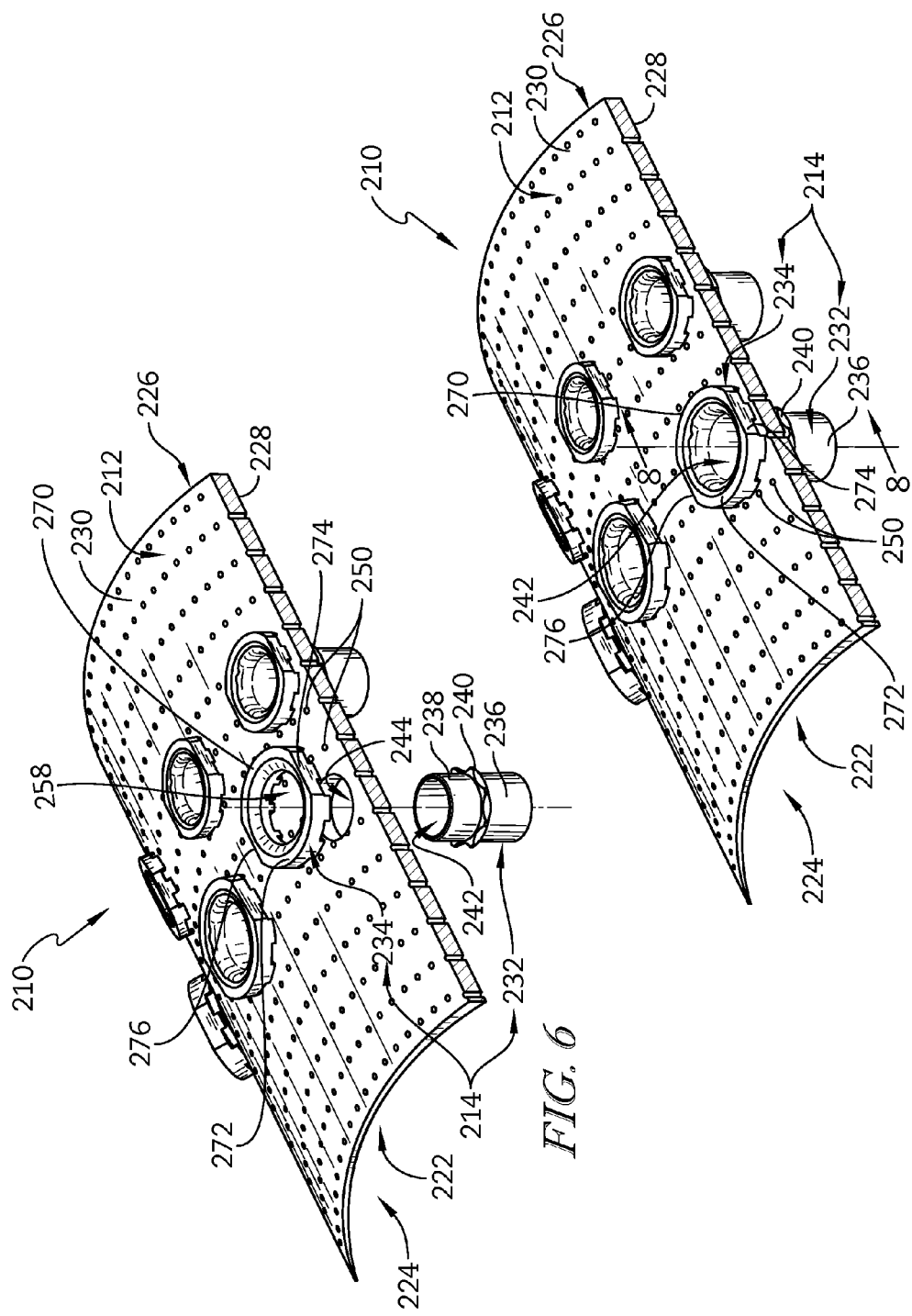

COMBUSTOR ASSEMBLY WITH CHUTES

CROSS REFERENCE TO RELATED APPLICATIONS

This application claims priority to and the benefit of U.S. Provisional Patent Application No. 62/013,217, filed 17 Jun. 2014, the disclosure of which is now expressly incorporated herein by reference.

STATEMENT REGARDING FEDERALLY SPONSORED RESEARCH OR DEVELOPMENT

Embodiments of the present disclosure were made with government support under Contract No. N00019-04-C-0093. The government may have certain rights.

FIELD OF THE DISCLOSURE

The present disclosure relates generally to combustors for gas turbine engines, and more specifically to combustors with combustor chutes that direct air into a combustion chamber of the combustor.

BACKGROUND

Gas turbine engines often include a combustor to mix and ignite air and fuel as part of an engine core that powers a fan assembly or a drive shaft. A typical combustor includes a combustion liner that forms a combustion chamber where the air and fuel is mixed and ignited. The combustion liner is formed to include at least one opening for compressed air to flow into the combustion chamber from an environment located outside of the combustion chamber. Fuel nozzles extend into the combustion chamber and provide the fuel to the combustor. During operation, the compressed air and fuel are mix together and are then ignited to produce a hot gas that exits the combustor to drive a turbine included in the engine core.

Combustors sometimes include chutes that extend into the combustion chamber and conduct air mixing into the combustion chamber. The chutes may be damaged over time and, thus, may need to be repaired or replaced.

SUMMARY

The present disclosure may comprise one or more of the following features and combinations thereof.

A combustor may include a combustion liner and a chute. The combustion liner may define a combustion chamber. The combustion liner may include an outer liner surface, an inner liner surface, and a chute-receiving aperture. The outer liner surface may face away from the combustion chamber. The inner liner surface may face toward the combustion chamber. The chute-receiving aperture may extend through the outer liner surface and the inner liner surface. The chute may extend through the chute-receiving aperture of the combustion liner and define a passageway sized to convey air from an environment outside the combustion chamber through the combustion liner into the combustion chamber.

The chute may include a chute body, a flared head, and a locating shoulder. The chute body may extend through the chute-receiving aperture and define the passageway. The flared head may be located outside of the combustion chamber and may extend outwardly from the chute body away from the passageway so that the flared head is sized to block movement of the chute through the combustion liner into the combustion chamber. The locating shoulder may be located inside of the combustion chamber and may extend outwardly from the chute body away from the passageway so that the locating shoulder is sized to block movement of the chute through the combustion liner away from the combustion chamber.

In some embodiments, the combustor may further include a retention washer located outside of the combustion chamber and coupled to the chute body. The retention washer may extend outwardly from the chute body away from the passageway along the outer liner surface to block movement of the chute through the combustion liner into the combustion chamber. In some embodiments, the retention washer may be coupled to the chute body without welding.

In some embodiments, the combustion liner may include a plurality of cooling holes that extend through the combustion liner arranged around the chute-receiving aperture. The retention washer may be formed to include a plurality of cooling channels arranged to face the outer liner surface of the combustion liner. The cooling channels may extend through the retention washer to provide a flow path for air to flow from the outer liner surface through the cooling channels and into the cooling holes arranged around the chute-receiving aperture.

In some embodiments, the retention washer may be formed to include a central opening. The central opening may be aligned with the chute-receiving aperture. The chute may extend through the central opening.

In some embodiments, the retention washer may be formed to include a central opening, an outer radial surface, an inner radial surface, a bottom surface, a top surface, and a chamfered surface. The outer radial surface may face away from the central opening. The inner radial surface may face the central opening. The bottom surface may extend between and interconnect the inner and outer radial surfaces. The top surface may be spaced apart from the bottom surface. The chamfered surface may extend between the inner radial surface and the top surface. The flared head may extend along the chamfered surface.

In some embodiments, the combustion liner may include a plurality of cooling holes that extend through the combustion liner. The cooling holes may be arranged around the chute-receiving aperture. The locating shoulder may be formed to include a plurality of cooling scallops arranged to face away from the chute body to provide a flow path for air to flow from the environment outside of the combustion chamber through the cooling holes into the combustion chamber. In some embodiments, the flared head may be frustoconical.

According to another aspect of the present disclosure, a combustor may include a combustion liner, a chute, and a retention washer. The combustion liner may define a combustion chamber. The combustion liner may include an outer liner surface, an inner liner surface, a chute-receiving aperture, and a plurality of cooling holes. The outer liner surface may face away from the combustion chamber. The inner liner surface may face toward the combustion chamber. The chute-receiving aperture may extend through the combustion liner. The cooling holes may extend through the combustion liner and may be arranged around the chute-receiving aperture.

The chute may include a chute body and a locating shoulder. The chute body may extend through the chute-receiving aperture of the combustion liner and define a passageway sized to convey air through the combustion liner into the combustion chamber from an environment outside the combustion chamber. The locating shoulder may be located inside of the combustion chamber and may extend outwardly from the chute body away from the passageway to block movement of the chute through the combustion liner away from the combustion chamber.

The retention washer may be located outside of the combustion chamber and may be coupled to the chute body. The retention washer may extend outwardly from the chute body away from the passageway to block movement of the chute through the combustion liner into the combustion chamber. The retention washer may be formed to include a plurality of cooling channels arranged to face the outer liner surface of the combustion liner to provide a flow path for air to flow from the environment outside of the combustion chamber through the cooling channels and into the cooling holes arranged around the chute-receiving aperture.

In some embodiments, the retention washer may be coupled to the chute body without welding. In some embodiments, the chute may further include a flared head. The flared head may be located outside of the combustion chamber and may extend outwardly from the chute body away from the passageway to couple the chute body to the retention washer. In some embodiments, the flared head may be frustoconical.

In some embodiments, the retention washer may be formed to include a central opening. The central opening may be aligned with the chute-receiving aperture. The chute may extend through the central opening.

In some embodiments, the retention washer may be formed to include a central opening, an outer surface, an inner surface, a bottom surface, a top surface, and a chamfered surface. The outer surface may face away from the central opening. The inner surface may face the central opening. The bottom surface may extend between and interconnect the inner and outer surfaces. The top surface may be spaced apart from the bottom surface. The chamfered surface may extend between the inner surface and the top surface. The flared head may extend along the chamfered surface.

In some embodiments, the outer surface of the retention washer may include a first straight sub-surface and second straight sub-surface. The first and second straight sub-surfaces may be linear and parallel to an air flow path of the combustor.

In some embodiments, the bottom surface of the retention washer may be formed to match a contour of the outer liner surface. In some embodiments, the locating shoulder may be formed to include a plurality of cooling scallops that provide a flow path for air to flow from the cooling holes into the combustion chamber.

According to another aspect of the present disclosure, a method of assembling a combustor is provided. The method may include inserting a chute through a chute-receiving aperture formed in a combustion liner so that a shoulder of the chute that extends outwardly from a chute body engages an inner liner surface of the combustion liner to block further movement of the chute through the chute-receiving aperture, and deforming a portion of the chute body that expends past an outer liner surface of the combustion liner, opposite the inner liner surface, to form a flared head to block movement of the chute out of the chute-receiving aperture.

In some embodiments, the method may further include sliding the chute through a retention washer arranged along the outer liner surface of the combustion liner before deforming the portion of the chute body so that the flared head engages the retention washer. In some embodiments, the combustion liner may define a plurality of cooling holes that extend through the combustion liner arranged around the chute-receiving aperture. The retention washer may be formed to include cooling channels arranged to face the outer liner surface of the combustion liner to provide a flow path for air to flow from the environment outside of the combustion chamber through the cooling channels and into the cooling holes.

These and other features of the present disclosure will become more apparent from the following description of the illustrative embodiments.

BRIEF DESCRIPTION OF THE DRAWINGS

FIG. 1 is a cutaway view of a gas turbine engine including a combustor for mixing compressed air with fuel and igniting the fuel-air mixture to provide power for the gas turbine engine;

FIG. 2 is an enlarged view of the combustor of FIG. 1 showing that the combustor includes a combustion liner defining a combustion chamber for igniting the fuel-air mixture and a plurality of chute assemblies extending into the combustion chamber to provide passages for mixing air to flow into the combustion chamber;

FIG. 3 is an enlarged cutaway view of the combustor of FIG. 1 showing that the combustion liner defines a chute-receiving aperture and the chute assembly includes a chute that extends into the chute-receiving aperture and a retention washer that couples to the chute;

FIG. 4 is an enlarged cutaway view of the combustor of FIG. 3 showing the chute extending through the chute-receiving aperture and that a flared head of the chute has been deformed to engage the retention washer and hold the chute in the chute-receiving aperture;

FIG. 6 is an enlarged cutaway view of another embodiment of a combustor showing the combustion liner defines a chute-receiving aperture and a chute assembly includes a chute and a retention washer including an outer radial surface having a number of flat surfaces;

FIG. 7 is an enlarged cutaway view of the combustor of FIG. 6 after the chute and the retention washer have been coupled to the combustion liner and showing that the flat surfaces of the retention washers are aligned in a direction of an air flow path of the combustor.

DETAILED DESCRIPTION OF THE DRAWINGS

Figure 5:
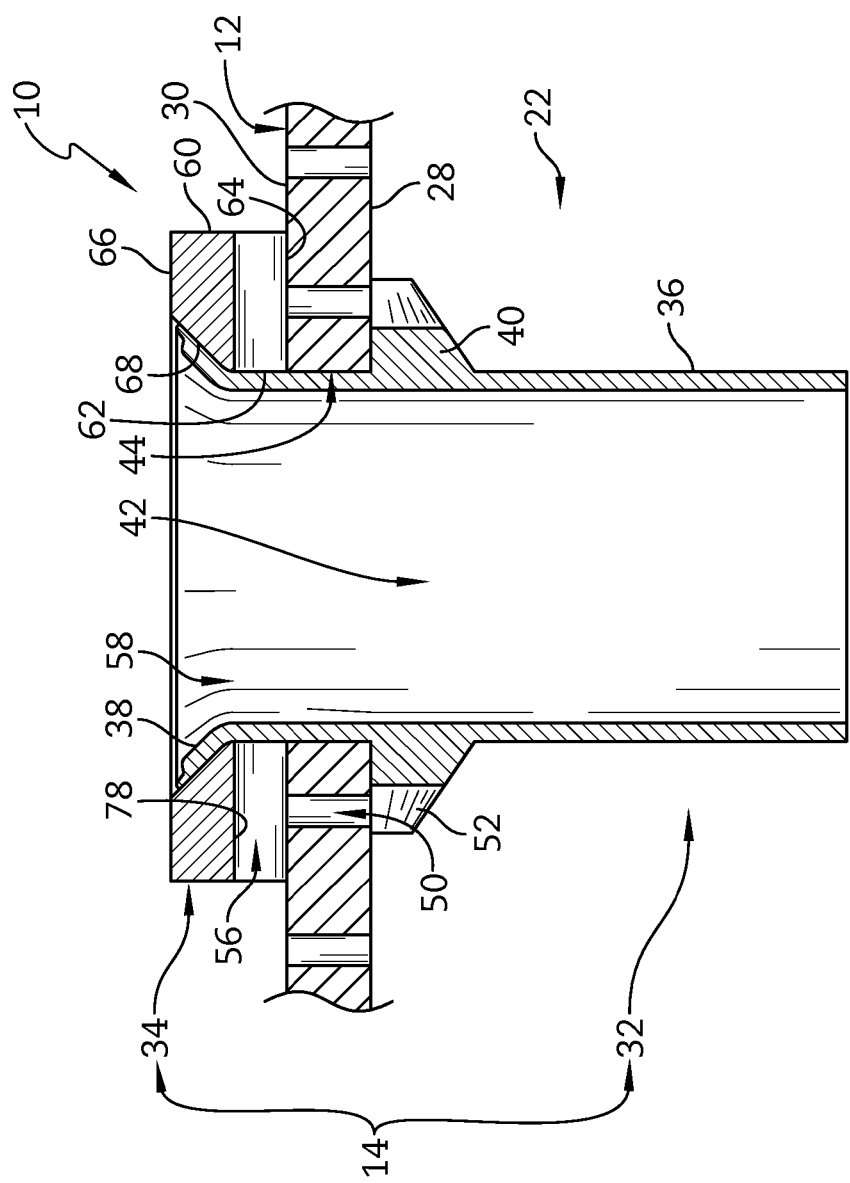
FIG. 5 is a cross-sectional view taken along line 5-5 of FIG. 4 showing that a locating shoulder of the chute engages an inner surface of the combustion liner and the flared head engages the retention washer to hold the chute in the chute-receiving aperture.

For the purposes of promoting an understanding of the principles of the disclosure, reference will now be made to a number of illustrative embodiments illustrated in the drawings and specific language will be used to describe the same.

An illustrative aerospace gas turbine engine 100 includes a combustor 10 as part of an engine core 120 that powers a fan assembly 130 or a drive shaft. The combustor 10 is configured to mix fuel with compressed air and to ignite the fuel-air mixture to power the engine core 120 as shown in FIG. 1. The combustor 10 includes a combustor liner 12 that extends around a central axis 20 of the engine 100 to define a combustion chamber 22. Compressed air, produced by a compressor 122 included in the engine core 120, is forced axially into the combustion chamber 22. Fuel nozzles (not shown) extend into a fore end 24 of the combustion chamber 22 and inject fuel into the combustion chamber 22. The compressed air and fuel are mixed together and are then ignited to produce a hot gas that exits an aft end 26 of the combustor 10 and enters a turbine 126. A plurality of combustor chute assemblies 14 extend radially into the combustion chamber 22 and conduct mixing air from outside of the combustor 10 into the combustion chamber 22 to mix the hot gas and to push the hot gas into the center of the combustion chamber 22.

The combustor 10 includes the combustion liner 12 and the plurality of chute assemblies 14 as shown in FIG. 2. The combustion liner 12 is illustratively made from a metallic alloy with cooling holes 50. In other embodiments, the combustion liner 12 may be made from composite materials, such as silicon-carbide silicon-carbide ceramic-matrix-composites. Each chute assembly 14 includes a chute 32 that extends through the combustion liner 12 into the combustion chamber 22 to provide a flow path for compressed air to enter the combustion chamber 22 from the compressor 122.

The chute 32 includes a chute body 36, a flared head 38, and a locating shoulder 40 as shown in FIG. 3. The chute body 36 extends through the combustion liner 12 and defines a passageway 42 for air to enter the combustion chamber 22 as shown in FIG. 4. The flared head 38 is located outside of the combustion chamber 22 and extends outwardly from the chute body 36 away from the passageway 42 so that the flared head is sized to block movement of the chute 32 through the combustion liner 12 into the combustion chamber 22 as shown in FIG. 5. The locating shoulder 40 is located inside of the combustion chamber 22 and extends outwardly from the chute body 36 away from the passageway 42 so that the locating shoulder 40 is sized to block movement of the chute 32 through the combustion liner 12 away from the combustion chamber 22.

In the illustrative embodiment, the chute assembly 14 further includes a retention washer 34. The retention washer 34 is located outside of the combustion chamber 22 and is coupled to the chute body 36 as shown in FIGS. 3-5. The retention washer 34 engages the flared head 38 to block movement of the chute 32 through the combustion liner 12 into the combustion chamber 22.

The combustor 10 is included in the gas turbine engine core 120 to power the turbine 126 as shown, for example, in FIG. 1. The engine core 120 includes the compressor 122, the combustor 10, and the turbine 126 all mounted to a case 128. The compressor 122 is configured to compress and deliver air to the combustor 10. The combustor 10 is configured to mix fuel with the compressed air received from the compressor 122 and to ignite the fuel. The hot high pressure products of the combustion reaction in the combustor 10 are directed into the turbine 126 and the turbine 126 extracts work to drive the compressor 122 and the fan assembly 130. The fan assembly 130 pushes air through the engine 100 to provide thrust for the aircraft.

In the illustrative embodiment, the combustor 10 includes an outer combustion liner 12 and an inner combustion liner 16 that cooperate to define the combustion chamber 22 as shown in FIG. 2. In the illustrative embodiment, the combustion chamber 22 is annular. In some embodiments, the outer and inner combustion liners 12, 16 are made up of a number of circumferentially adjacent segments. In other embodiments, the outer and inner combustion liners 12, 16 may be full annular monolithic components.

The inner combustion liner 16 extends circumferentially around the central axis 20 at a first radius as shown in FIG. 2. The outer combustion liner 12 is coaxial with the inner combustion liner 16 and extends circumferentially around the central axis 20 at a second radius that is greater than the first radius. The plurality of chute assemblies 14 extend through both the outer and inner combustion liners 12, 16 into the combustion chamber 22. The inner combustion liner 16 is substantially similar to the outer combustion liner 12 and, thus, only the outer combustion liner 12 is discussed in further detail.

The combustion liner 12 includes an inner liner surface 28 facing toward the central axis 20 and an outer liner surface 30 facing away from the central axis 20 as shown in FIG. 3. The combustion liner 12 is formed to define a plurality of chute-receiving apertures 44 that extend through the outer liner surface 30 and the inner liner surface 28. Each chute-receiving aperture 44 receives a chute assembly 14 that extends through the inner and outer liner surfaces 28, 30 of the combustion liner 12.

In the illustrative embodiment, the combustion liner 12 is further formed to include a plurality of cooling holes 50 that extend through the outer liner surface 30 and the inner liner surface 28 as shown in FIG. 3. The cooling holes 50 provide passageways for relatively cool compressed air to pass through the combustion liner 12 and along the inner and outer liner surfaces 28, 30 to cool the combustion liner 12. A number of the cooling holes 50 are arranged around the chute-receiving aperture 44.

The chute assembly 14 couples to the combustion liner 12 to provide a passageway 42 sized to convey air from an environment outside of the combustion chamber 22 through the combustion liner 12 into the interior of the combustion chamber 22 as shown in FIGS. 2-5. In the illustrative embodiment, the chute assembly 14 includes the chute 32 and the retention washer 34. In other embodiments, the chute assembly may include only the chute 32.

The chute 32 couples the chute assembly 14 to the combustion liner 12 and defines the passageway 42 as shown in FIGS. 3 and 4. The chute 32 includes a chute body 36, a flared head 38, and a locating shoulder 40. The chute body 36 extends through the chute-receiving aperture 44 to direct air into the combustion chamber 22. The flared head 38 blocks movement of the chute 32 through the combustion liner 12 into the combustion chamber 22. The locating shoulder 40 blocks movement of the chute 32 through the combustion liner 12 away from the combustion chamber 22.

The chute body 36 extends through the combustion liner 12 and defines the passageway 42 as shown in FIGS. 3 and 4. In the illustrative embodiment, the chute body 36 extends radially toward the central axis 20. In the other embodiments, the chute body 36 is angled relative to the central axis 20 to direct the air to a desired location in the combustion chamber 22. In the illustrative embodiment, the chute body 36 and the passageway 42 are cylindrical.

The flared head 38 is located outside of the combustion chamber 22 and extends outwardly from the chute body 36 away from the passageway 42 so that the flared head 38 is sized to block movement of the chute 32 through the combustion liner 12 into the combustion chamber 22 as shown in FIGS. 4 and 5. The flared head 38 is sized to be received in the chute-receiving aperture 44 before the chute 32 is coupled to the combustion liner 12 as shown in FIG. 3. The flared head 38 is deformed outwardly away from the passageway 42 after the chute 32 is positioned in the chute-receiving aperture 44 to couple the chute 32 to the combustion liner 12 as shown in FIG. 4. In the illustrative embodiment, the chute 32 is swaged to deform the flared head 38.

In the illustrative embodiment, the flared head 38 is deformed outwardly so that an outer dimension of the flared head 38 is larger than the chute-receiving aperture 44 so that the chute 32 is blocked from moving through the combustion liner 12 into the combustion chamber 22 as shown in FIG. 4. In the illustrative embodiment, the flared head 38 is frustoconical shaped.

The locating shoulder 40 is located inside of the combustion chamber 22 and extends outwardly from the chute body 36 away from the passageway 42 so that the locating shoulder 40 is sized to block movement of the chute 32 through the combustion liner 12 away from the combustion chamber 22 as shown in FIGS. 3-5. The locating shoulder 40 engages the inner liner surface 28 of the combustion liner 12 to couple the chute 32 to the combustion liner 12 as shown in FIG. 5.

In the illustrative embodiment, the locating shoulder 40 is formed to include a plurality of cooling scallops 52 as shown in FIG. 3. The cooling scallops 52 are arranged to face away from the chute body 36 to provide a flow path for air to flow from the environment outside of the combustion chamber 22 through the cooling holes 50 into the combustion chamber 22 as shown in FIGS. 3-5.

In the illustrative embodiment, the chute assembly 14 further includes the retention washer 34 as shown in FIGS. 3-5. The retention washer 34 is located outside of the combustion chamber 22 and is coupled to the chute body 36 as shown in FIGS. 3 and 4. In the illustrative embodiment, the retention washer 34 is coupled to the chute 32 without welding. The retention washer 34 extends outwardly from the chute body 36 away from the passageway 42 to block movement of the chute 32 through the combustion liner 12 into the combustion chamber 22. The retention washer 34 engages the outer liner surface 30 and has an outer dimension that is larger than the chute-receiving aperture 44 to block the retention washer 34 from passing through the chute-receiving aperture 44.

The retention washer 34 is formed to include a central opening 58 that receives the chute body 36 and flared head 38 of the chute 32 as shown in FIGS. 3-5. The retention washer 34 includes an outer surface 60, an inner surface 62, a bottom surface 64, and a top surface 66 spaced apart from the bottom surface 64. The outer surface 60 faces away from the central opening 58 and the inner surface 62 faces toward the central opening 58. The bottom surface 64 extends between and interconnects the outer and inner surfaces 60, 62. In the illustrative embodiment, the bottom surface 64 is formed to match a contour of the outer liner surface 30.

In the illustrative embodiment, the retention washer 34 further includes a chamfered surface 68 that extends between the inner surface 62 and the top surface 66 as shown in FIG. 5. When the flared head 38 is deformed, the chamfered surface 68 engages the flared head 38 to cause the flared head 38 to have a frustoconical shape.

In the illustrative embodiment, the retention washer 34 is formed to include a plurality of cooling channels 56 as shown in FIGS. 3-5. The cooling channels 56 are arranged to face the outer liner surface 30 of the combustion liner 12 to provide a flow path for air to flow from the environment outside of the combustion chamber 22 through the cooling channels 56 and into the cooling holes 50 arranged around the chute-receiving aperture 44. The cooling channels 56 extend through the outer surface 60 and the inner surface 62 of the retention washer 34. The cooling channels 56 extend upward from the bottom surface 64 toward the top surface 66 and terminate at a channel surface 78 located radially between the bottom surface 64 and the top surface 66 as shown in FIG. 5.

A method of assembling the combustor 10 is shown in FIGS. 3-4. The chute 32 is inserted through the chute-receiving aperture 44 formed in the combustion liner 12 so that a portion of the chute body 36 extends through the chute-receiving aperture 44 and the locating shoulder 40 engages the inner liner surface 28 to block further movement of the chute 32 through the chute-receiving aperture 44 away from the central axis 20. The flared head 38 is deformed to block movement of the chute 32 toward the central axis 20 and out of the chute-receiving aperture 44. In the illustrative embodiment, the flared head 38 is deformed by a swaging process but other deformation processes may be used.

In some embodiments, the chute 32 is slid through the retention washer 34 arranged along the outer liner surface 30 of the combustion liner 12 before the flared head 38 is deformed (swaged). As a result, after the flared head 38 is deformed (swaged), the flared head 38 engages the retention washer 34. In some embodiments, such as when replacing a damaged chute assembly, the flared head 38 or the locating shoulder 40 are separated from the chute body 36 so that the chute 32 is uncoupled from the retention washer 34 without damaging the combustion liner 12 and/or the retention washer 34 as may be necessary if the chute 32 is welded or otherwise integrated with the combustion liner 12.

Figure 8:
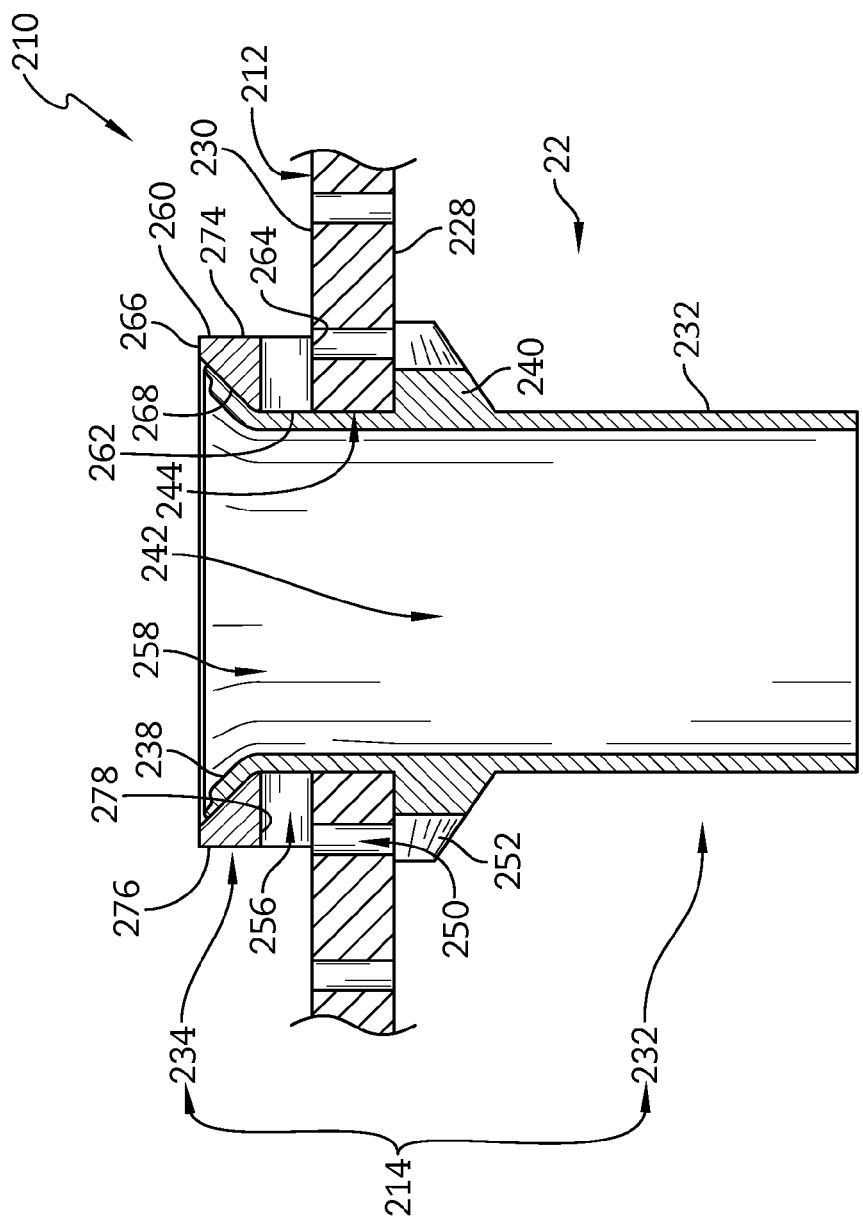
FIG. 8 is a cross-sectional view taken along line 8-8 of FIG. 7 showing that a locating shoulder of the chute engages an inner surface of the combustion liner and the flared head engages the retention washer to hold the chute in the chute-receiving aperture.

Another illustrative combustor 210 adapted for use in gas turbine engine 100 is shown in FIGS. 6-8. The combustor 210 is substantially similar to the combustor 10 shown in FIGS. 1-5 and described herein. Accordingly, similar reference numbers in the 200 series indicate features that are common between the combustor 10 and the combustor 210. The description of the combustor 10 is hereby incorporated by reference to apply to the combustor 210, except in instances when it conflicts with the specific description and drawings of the combustor 210.

The outer surface 260 of the retention washer 234 includes a first round sub-surface 270, a second round sub-surface 272, a first straight sub-surface 274, and a second straight sub-surface 276 as shown in FIG. 6. The first and second round sub-surfaces 270, 272 are curved. The first straight sub-surface 274 is linear and extends between the first and second round sub-surfaces 270, 272. The second straight sub-surface 276 is linear and extends between the first and second round sub-surfaces 270, 272. The second straight sub-surface 276 is spaced apart from and parallel to the first straight sub-surface 274.

The compressed air from the compressor 222 passes through the combustor 210 axially from the fore end 224 to the aft end 226 to define an air flow path. The retention washer 234 is aligned such that the first and second straight sub-surfaces 274, 276 are parallel with the air flow path of the combustor 210 as shown in FIG. 7.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A combustor for use in a gas turbine engine, the combustor comprising:
   a combustion liner that defines a combustion chamber, the combustion liner including an outer liner surface facing away from the combustion chamber, an inner liner surface facing toward the combustion chamber, and a chute-receiving aperture that extends through the outer liner surface and the inner liner surface, and a chute that extends through the chute-receiving aperture of the combustion liner and defines a passageway sized to convey air from an environment outside the combustion chamber through the combustion liner into the combustion chamber, wherein the chute includes a chute body that extends through the chute-receiving aperture and defines the passageway, a flared head located outside of the combustion chamber that extends outwardly from the chute body away from the passageway so that the flared head is sized to block movement of the chute through the combustion liner into the combustion chamber, and a locating shoulder located inside of the combustion chamber that extends outwardly from the chute body away from the passageway so that the locating shoulder is sized to block movement of the chute through the combustion liner away from the combustion chamber, wherein the combustion liner includes a plurality of cooling holes that extend through the combustion liner and that are arranged around the chute-receiving aperture and the locating shoulder is formed to include a plurality of cooling scallops arranged to face away from the chute body to provide a flow path for the air to flow from the environment outside of the combustion chamber through the plurality of cooling holes into the combustion chamber.

2. The combustor of claim 1, further comprising a retention washer located outside of the combustion chamber and coupled to the chute body, wherein the retention washer extends outwardly from the chute body away from the passageway along the outer liner surface to block movement of the chute through the combustion liner into the combustion chamber.

3. The combustor of claim 2, wherein the retention washer is coupled to the chute body without welding.

4. The combustor of claim 2, wherein the retention washer is formed to include a plurality of cooling channels arranged to face the outer liner surface of the combustion liner that extend through the retention washer to provide a flow path for the air to flow from the outer liner surface through the plurality of cooling channels and into the plurality of cooling holes arranged around the chute-receiving aperture.

5. The combustor of claim 2, wherein the retention washer is formed to include a central opening, the central opening is aligned with the chute-receiving aperture, and the chute extends through the central opening.

6. The combustor claim 1, wherein the flared head is frustoconical.

7. A combustor for use in a gas turbine engine, the combustor comprising:

a combustion liner that defines a combustion chamber, the combustion liner including an outer liner surface facing away from the combustion chamber, an inner liner surface facing toward the combustion chamber, and a chute-receiving aperture that extends through the outer liner surface and the inner liner surface, a chute that extends through the chute-receiving aperture of the combustion liner and defines a passageway sized to convey air from an environment outside the combustion chamber through the combustion liner into the combustion chamber, and wherein the chute includes a chute body that extends through the chute-receiving aperture and defines the passageway, a flared head located outside of the combustion chamber that extends outwardly from the chute body away from the passageway so that the flared head is sized to block movement of the chute through the combustion liner into the combustion chamber, and a locating shoulder located inside of the combustion chamber that extends outwardly from the chute body away from the passageway so that the locating shoulder is sized to block movement of the chute through the combustion liner away from the combustion chamber, a retention washer located outside of the combustion chamber and coupled to the chute body, wherein the retention washer extends outwardly from the chute body away from the passageway along the outer liner surface to block movement of the chute through the combustion liner into the combustion chamber, wherein the retention washer is formed to include a central opening, an outer radial surface facing away from the central opening, an inner radial surface facing the central opening, a bottom surface extending between and interconnecting the inner and outer radial surfaces, a top surface spaced apart from the bottom surface, and a chamfered surface that extends between the inner radial surface and the top surface and the flared head extends along the chamfered surface.

8. A combustor for use in a gas turbine engine, the combustor comprising:

a combustion liner that defines a combustion chamber, the combustion liner including an outer liner surface facing away from the combustion chamber, an inner liner surface facing toward the combustion chamber, a chute-receiving aperture that extends through the combustion liner, and a plurality of cooling holes that extend through the combustion liner arranged around the chute-receiving aperture, a chute including a chute body and a locating shoulder, the chute body extending through the chute-receiving aperture of the combustion liner and defining a passageway sized to convey air through the combustion liner into the combustion chamber from an environment outside the combustion chamber, the locating shoulder located inside of the combustion chamber and extending outwardly from the chute body away from the passageway to block movement of the chute through the combustion liner away from the combustion chamber, and a retention washer located outside of the combustion chamber and coupled to the chute body, the retention washer extending outwardly from the chute body away from the passageway to block movement of the chute through the combustion liner into the combustion chamber, the retention washer formed to include a plurality of cooling channels arranged to face the outer liner surface of the combustion liner to provide a flow path for the air to flow from the environment outside of the combustion chamber through the plurality of cooling channels and into the plurality of cooling holes arranged around the chute-receiving aperture, wherein the locating shoulder is formed to include a plurality of cooling scallops that provide a flow path for the air to flow from the plurality of cooling holes into the combustion chamber.

9. The combustor of claim 8, wherein the retention washer is coupled to the chute body without welding.

10. The combustor of claim 8, wherein the chute further includes a flared head located outside of the combustion chamber that extends outwardly from the chute body away from the passageway to couple the chute body to the retention washer.

11. The combustor of claim 10, wherein the flared head is frustoconical.

12. The combustor of claim 10, wherein the retention washer is formed to include a central opening, the central opening is aligned with the chute-receiving aperture, and the chute extends through the central opening.

13. A combustor for use in a gas turbine engine, the combustor comprising:

a combustion liner that defines a combustion chamber, the combustion liner including an outer liner surface facing away from the combustion chamber, an inner liner surface facing toward the combustion chamber, a chute-receiving aperture that extends through the combustion liner, and a plurality of cooling holes that extend through the combustion liner arranged around the chute-receiving aperture, a chute including a chute body and a locating shoulder, the chute body extending through the chute-receiving aperture of the combustion liner and defining a passageway sized to convey air through the combustion liner into the combustion chamber from an environment outside the combustion chamber, the locating shoulder located inside of the combustion chamber and extending outwardly from the chute body away from the passageway to block movement of the chute through the combustion liner away from the combustion chamber, and a retention washer located outside of the combustion chamber and coupled to the chute body, the retention washer extending outwardly from the chute body away from the passageway to block movement of the chute through the combustion liner into the combustion chamber, the retention washer formed to include a plurality of cooling channels arranged to face the outer liner surface of the combustion liner to provide a flow path for the air to flow from the environment outside of the combustion chamber through the plurality of cooling channels and into the plurality of cooling holes arranged around the chute-receiving aperture, wherein the chute further includes a flared head located outside of the combustion chamber that extends outwardly from the chute body away from the passageway to couple the chute body to the retention washer, wherein the retention washer is formed to include a central opening, an outer surface that faces away from the central opening, an inner surface that faces the central opening, a bottom surface extending between and interconnecting the inner and outer surfaces, a top surface spaced apart from the bottom surface, and a chamfered surface that extends between the inner surface and the top surface and the flared head extends along the chamfered surface.

14. The combustor of claim 13, wherein the outer surface of the retention washer includes a first straight sub-surface and a second straight sub-surface, the first and second straight sub-surfaces are linear and parallel to a flow path of hot high pressure products of the combustor.

15. The combustor of claim 13, wherein the bottom surface of the retention washer is formed to match a contour of the outer liner surface.

* * * * *